United States Patent
Wu et al.

(10) Patent No.: US 10,160,174 B2
(45) Date of Patent: Dec. 25, 2018

(54) METHOD OF MANUFACTURING SPORTS PROTECTIVE EQUIPMENT, AND SPORT PROTECTIVE EQUIPMENT MANUFACTURED BY THE SAME

(71) Applicants: Hsien-Chang Wu, Taipei (TW); Hung-Sung Hsu, Taipei (TW)

(72) Inventors: Hsien-Chang Wu, Taipei (TW); Hung-Sung Hsu, Taipei (TW)

(*) Notice: Subject to any disclaimer, the term of this patent is extended or adjusted under 35 U.S.C. 154(b) by 529 days.

(21) Appl. No.: 14/870,026

(22) Filed: Sep. 30, 2015

(65) Prior Publication Data

US 2017/0087786 A1   Mar. 30, 2017

(51) Int. Cl.
| | |
|---|---|
| B29D 99/00 | (2010.01) |
| B29C 51/10 | (2006.01) |
| A41D 19/015 | (2006.01) |
| A41D 19/00 | (2006.01) |
| B29C 51/26 | (2006.01) |
| B29C 65/08 | (2006.01) |
| B29C 65/02 | (2006.01) |
| B29C 59/02 | (2006.01) |
| B29K 27/06 | (2006.01) |
| B29K 75/00 | (2006.01) |
| B29K 25/00 | (2006.01) |

(Continued)

(52) U.S. Cl.
CPC ..... B29D 99/0064 (2013.01); B29D 99/0067 (2013.01); *A41D 19/0006* (2013.01); *A41D 19/01523* (2013.01); *A41D 19/01558* (2013.01); *B29C 51/10* (2013.01); *B29C 51/268* (2013.01); *B29C 59/02* (2013.01); *B29C 65/02* (2013.01); *B29C 65/08* (2013.01); *B29C 2791/006* (2013.01); *B29K 2023/06* (2013.01); *B29K 2025/06* (2013.01); *B29K 2027/06* (2013.01); *B29K 2075/00* (2013.01); *B29K 2105/04* (2013.01); *B29K 2105/048* (2013.01); *B29K 2105/256* (2013.01); *B29L 2031/4864* (2013.01); *B29L 2031/768* (2013.01)

(58) Field of Classification Search
None
See application file for complete search history.

(56) References Cited

U.S. PATENT DOCUMENTS

| | | | | |
|---|---|---|---|---|
| 3,773,875 A | * | 11/1973 | Lammers | B29C 44/143 249/121 |
| 7,246,568 B1 | * | 7/2007 | Cheung | A63C 5/03 114/357 |

(Continued)

*Primary Examiner* — Jeffry H Aftergut
(74) *Attorney, Agent, or Firm* — Leong C. Lei

(57) ABSTRACT

Disclosed are a method of manufacturing sport protective equipment and sport protective equipment manufactured by the method. A thin casing is manufactured by a thin sheet material in a vacuum forming process; protrusions are formed apart from one another on a surface of the thin casing; a containing space is formed on an inner side of each protrusion for filling a filler; and a substrate is provided to seal the bottom of the thin casing, so that the filler in each of the containing spaces will not fall out, so as to improve the manufacturing efficiency and the product quality. The sport protective equipment manufactured by this method does not require any sewing manufacture or increase thickness, so that the flexibility of wearing and using is improved, and the thin casing and the filler are provided for absorbing shocks to improve the protective effect.

6 Claims, 7 Drawing Sheets

(51) Int. Cl.
*B29K 105/04* (2006.01)
*B29K 105/00* (2006.01)
*B29L 31/00* (2006.01)
*B29L 31/48* (2006.01)

(56) References Cited

U.S. PATENT DOCUMENTS

| | | | |
|---|---|---|---|
| 2004/0034903 A1* | 2/2004 | Blair | A42B 1/08 2/411 |
| 2007/0160798 A1* | 7/2007 | Yeh | B29C 44/129 428/71 |
| 2011/0135825 A1* | 6/2011 | Lee | A42B 3/061 427/260 |
| 2014/0093695 A1* | 4/2014 | Botsch | A42B 3/121 428/166 |

* cited by examiner

METHOD OF MANUFACTURING SPORTS PROTECTIVE EQUIPMENT, AND SPORT PROTECTIVE EQUIPMENT MANUFACTURED BY THE SAME

TECHNICAL FIELD

The technical field relates to the manufacture of sports protective equipments, and more particularly to a method of manufacturing a sport protective equipment and a sport protective equipment manufactured by the method, wherein a casing is manufactured and integrally formed in a vacuum forming process and provided for containing a shock absorbing material to substitute the conventional sewn containing bag or casing that takes much time and efforts.

BACKGROUND

In modern sports such as baseball and American football games, equipments and players' body usually collide with one another during the game, and the players may be injured by the impacts of the collision easily. Therefore, sports protective equipments are used according to different requirements. For example, hockey goalkeepers wear gloves and protective gears, and baseball catchers wear protective equipments, etc. These sports protective equipments not just protect the player's body during the vigorous physical activity only, but also take flexibility and mobility into consideration for the game to improve the players' safety and the level of excitement of the game.

To absorb the impact of various type of collisions, these sports protective equipments are made of shock absorbing materials such as silicone, foam, sponge, etc and also require a casing for fixing the shock absorbing materials effectively, and a soft fabric that can be worn to cover a part of the wearer's body. However, the design of the sports protective equipments of the sort must be easy and convenient to be taken off. More importantly, these sports protective equipments do not affect the mobility and flexibility of the wearer's activities. Therefore, it is exceptionally important to design a sport protective equipment with a good shock absorbing effect without affecting the mobility and flexibility of the wearers' activities.

In general, the shock absorbing material is elastic and not easy-to-shape, so that the sport protective equipment may be deformed by collisions easily, and most sports protective equipments generally come with a casing made of a hard and light material or a containing bag or box formed by sewing fabrics to cover and fix the shock absorbing material.

However, the hard casing may affect the mobility and flexibility of the wearer's activity, so that the volume of the casing is preferably not too large, and the design preferably has a plurality of casings stitched or bonded to the fabric. As a result, the thickness of the stitching or sewing portion is increased, or the tension of the sewing thread causes an increase of thickness and hardness and affects the activity of sports adversely. In addition, the manufacturing procedure requires the step of fixing the casings onto a substrate one by one, and such complicated manufacturing procedure takes much time and effort, not just causing a low efficiency only, but also increasing the manufacturing cost and the assembling cost. Although the shape of the containing bags or boxes made of fabric and manufactured manually by stitching may be changed as needed, yet the manufacturing efficiency of the manual stitching is low, and the quality of the finished goods cannot be controlled easily. In addition, the fabrics are folded and sewed repeatedly, so that the thickness is increased, the hardness is increased, and the flexibility of the wearer's activity is affected adversely.

In view of the aforementioned drawbacks, this disclosure provides a method of manufacturing a sport protective equipment and a sport protective equipment manufactured by the method to achieve the effects of improving the manufacturing efficiency and the quality of the finished goods and reducing the manufacturing cost. The sport protective equipment comprises a thin casing made of a thin sheet material in a vacuum shaping process and having a plurality of containing spaces disposed apart from each other and formed on a surface of the casing for filling a filling material, and the casing may be combined with a substrate directly to save the manufacturing time of bonding a large quantity of casings, and the containing spaces of the thin casing manufactured by the vacuum shaping process are fixed and arranged apart from one another without requiring any other tool, so as to improve the manufacturing efficiency and the quality of the finished goods significantly.

SUMMARY

In view of the problems of the prior art, it is a primary objective of this disclosure to provide a method of manufacturing a sport protective equipment to achieve the effects of improving the manufacturing efficiency and reducing the production cost.

To achieve the aforementioned and other objectives, this disclosure provides a method of manufacturing a sports protective equipment, comprising the steps of: providing a thin sheet material, a filler and a substrate, wherein the substrate is in the shape of a covered using portion; manufacturing a thin casing by the thin sheet material in a vacuum forming process, and forming a plurality of protrusions arranged apart from one another on a surface of the thin casing, such that a containing space is formed on an inner side of each protrusion, and the thin casing is manufactured in a shape corresponsive to the substrate; filling the filler into each of the containing spaces; and sealing the bottom of the thin casing by the substrate, so that the filler in each of the containing spaces will not fall out. This method skips the steps of a conventional manufacturing process including the repeated shaping, positioning and bonding steps of manufacturing a casing, so as to improve the manufacturing efficiency and lower the manufacturing cost effectively. Obviously, such method is very helpful to the future development of sports protective equipments.

To improve the aesthetic appearance and protection of the sports protective equipment, the manufacturing method of this disclosure further comprises the step of bonding a surface material, wherein a surface material is bonded onto a surface of the thin sheet material before the step of "providing a thin sheet material, a filler and a substrate, wherein the substrate is manufactured in the shape of a covered using portion" takes place, and the surface material is one selected from the group consisting of an elastically contractible fabric and a plastic material, so that the surface material is covered onto a surface of the thin casing. It is noteworthy that the surface material can be formed in the shape of the thin casing while the thin sheet material is being formed in the vacuum forming process, and the surface material is provided for absorbing the impact when the thin casing is collided, and the surface material with different patterns and colors can improve the aesthetic appearance of the sports protective equipment.

In a preferred embodiment, the thin sheet material is one selected from the group consisting of thermoplastic polyurethane (TPU) and polyvinylchloride (PVC), and the filling material is one selected from the group consisting of a foam, an airbag, a tubular polypropylene PP particle, a foaming polyethylene (PE) particle, and any combination of the above.

To improve the supporting effect and preventing insufficient strength of the hard casing, the method of this disclosure further comprises the step of installing a supporting material, wherein a supporting material is installed between the filler and the substrate after the step of "filling the filler into each of the containing spaces" is completed, and the supporting material is a sheet material made of polyethylene (PE). Such arrangement provides the required supporting effect to users who wear the sport protective equipment without increasing too much weight or affecting the flexibility of the wearer's activity.

A secondary objective of this disclosure is to provide a sport protective equipment manufactured by the aforementioned method, so as to achieve the effects of improving the manufacturing efficiency and reducing the production cost.

To achieve the aforementioned and other objectives, this disclosure further provides a sport protective equipment comprising: the plurality of protrusions, arranged apart from one another and protruded on a surface of the thin casing, after the thin sheet material is formed by a vacuum forming process, such that a containing space is formed on an inner side of each of the protrusions; the filler, installed in each of the containing spaces; and the substrate, manufactured in the shape corresponsive to a covered using portion, and the thin casing being in the shape corresponsive to the shape of the substrate, and the substrate being provided for sealing the thin casing, so that the filler in each of the containing spaces will not fall out.

To improve the aesthetic appearance and protection of the sports protective equipment, the sport protective equipment further comprises a surface material fixed onto a surface of the thin sheet material by printing or bonding, and the surface material is one selected from the group consisting of a dye, an elastic fabric and a plastic material, so that the surface material is maintained to be covered onto a surface of the thin casing after the thin sheet material is formed. It is noteworthy that the surface material can be formed in the shape of the thin casing while the thin sheet material is being formed in the vacuum forming process, so that the surface material becomes a part of the thin casing. The surface material with different patterns and colors not just improves the aesthetic appearance only, but the elastic surface material also absorbs the impact when the thin casing is collided.

In a preferred embodiment, the thin sheet material is one selected from the group consisting of thermoplastic polyurethane (TPU) and polyvinylchloride (PVC), and the filling material is one selected from the group consisting of a foam, an airbag, a tubular polypropylene PP particle, a foaming polyethylene (PE) particle, and any combination of the above.

To improve the supporting effect and preventing insufficient strength of the hard casing, the sport protective equipment of this disclosure further comprises a supporting material installed between the filler and the substrate, and the supporting material is a PE sheet material. Such arrangement provides the required supporting effect to users who wear the sport protective equipment without increasing too much weight or affecting the flexibility of the wearer's activity.

DESCRIPTION OF THE PREFERRED EMBODIMENTS

Figure 1:
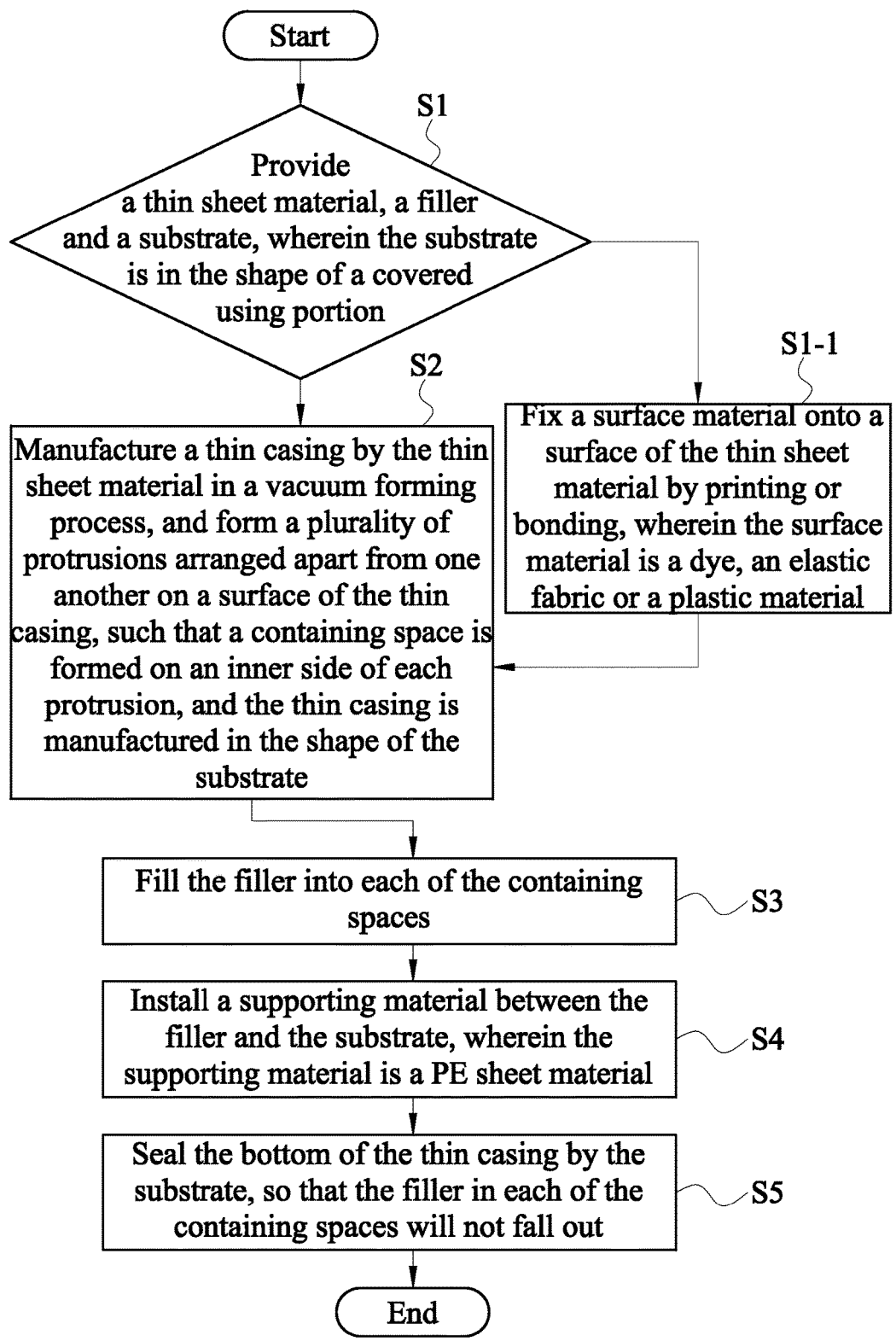
FIG. 1 is a flow chart of a preferred embodiment of this disclosure.
Figure 2:
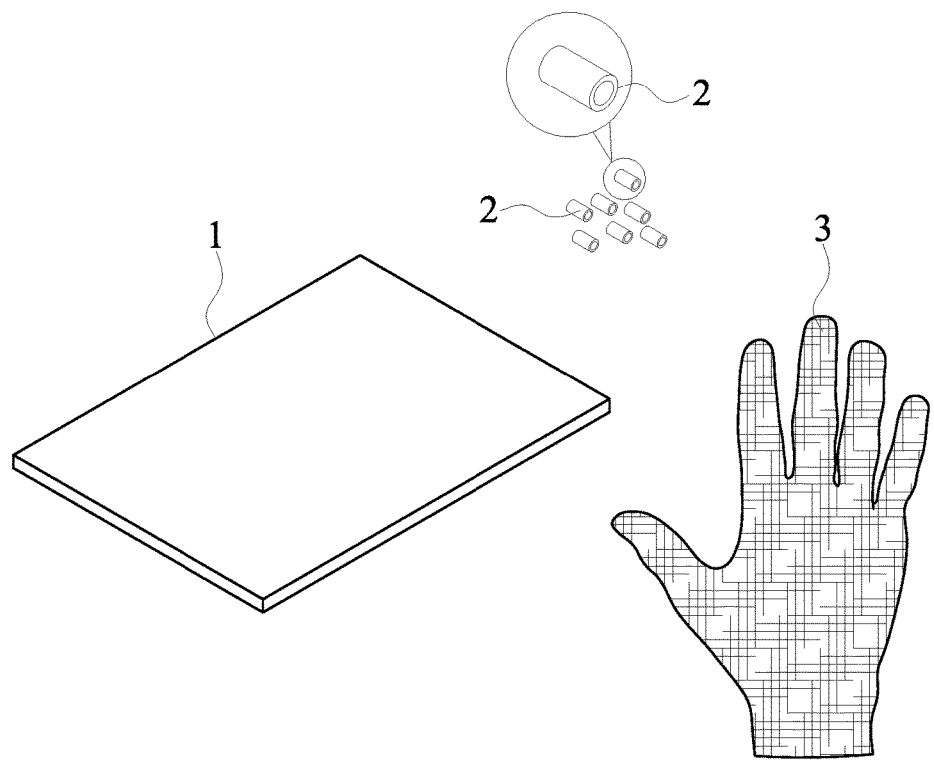
FIG. 2 is a schematic view of the status of Step S1 of a preferred embodiment of this disclosure.
Figure 3:
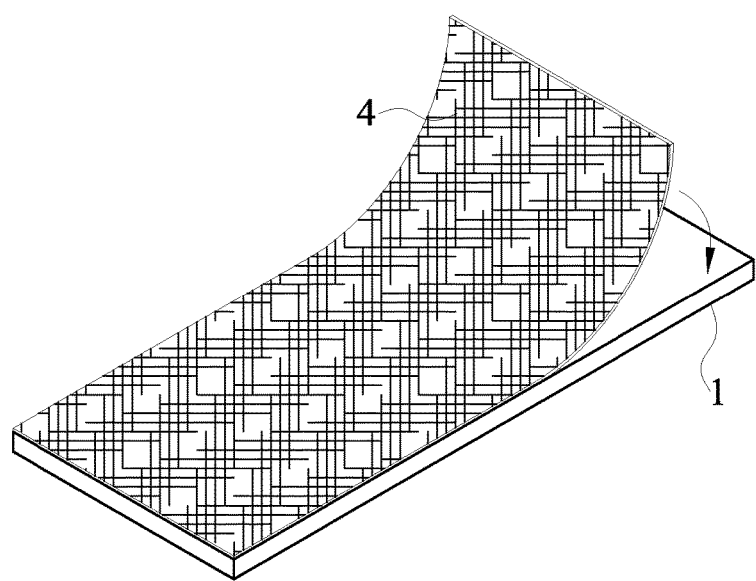
FIG. 3 is a schematic view of the status of Step S1-1 of a preferred embodiment of this disclosure.
Figure 4:
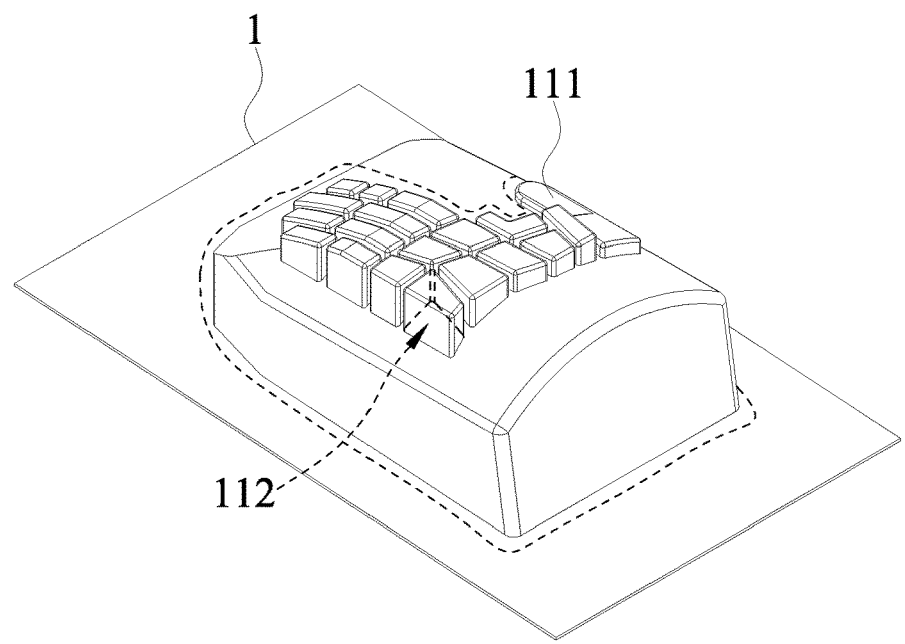
FIG. 4 is a schematic view of the status of Step S1-2 of a preferred embodiment of this disclosure.
Figure 5:
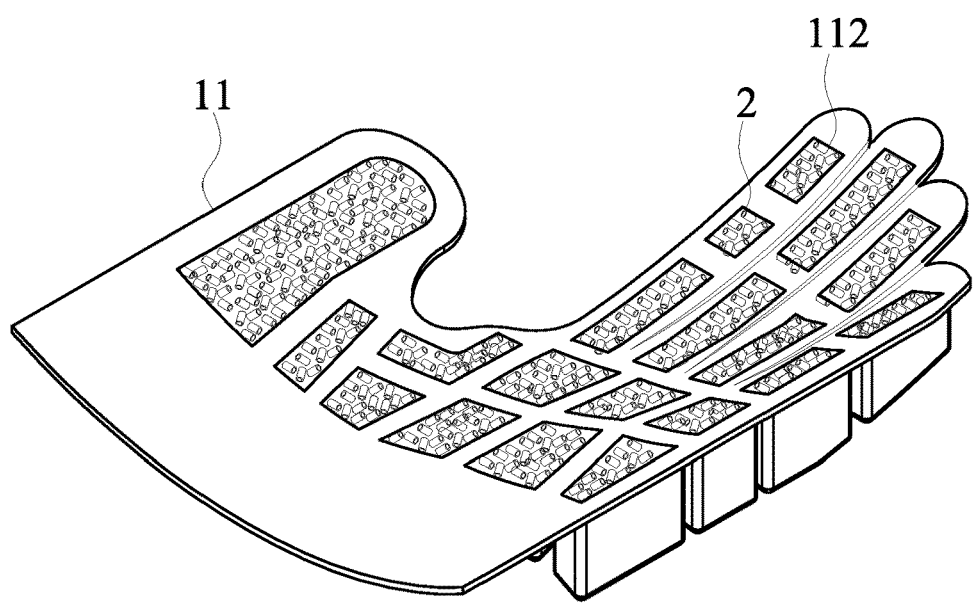
FIG. 5 is a schematic view of the status of Step S3 of a preferred embodiment of this disclosure.
Figure 6:
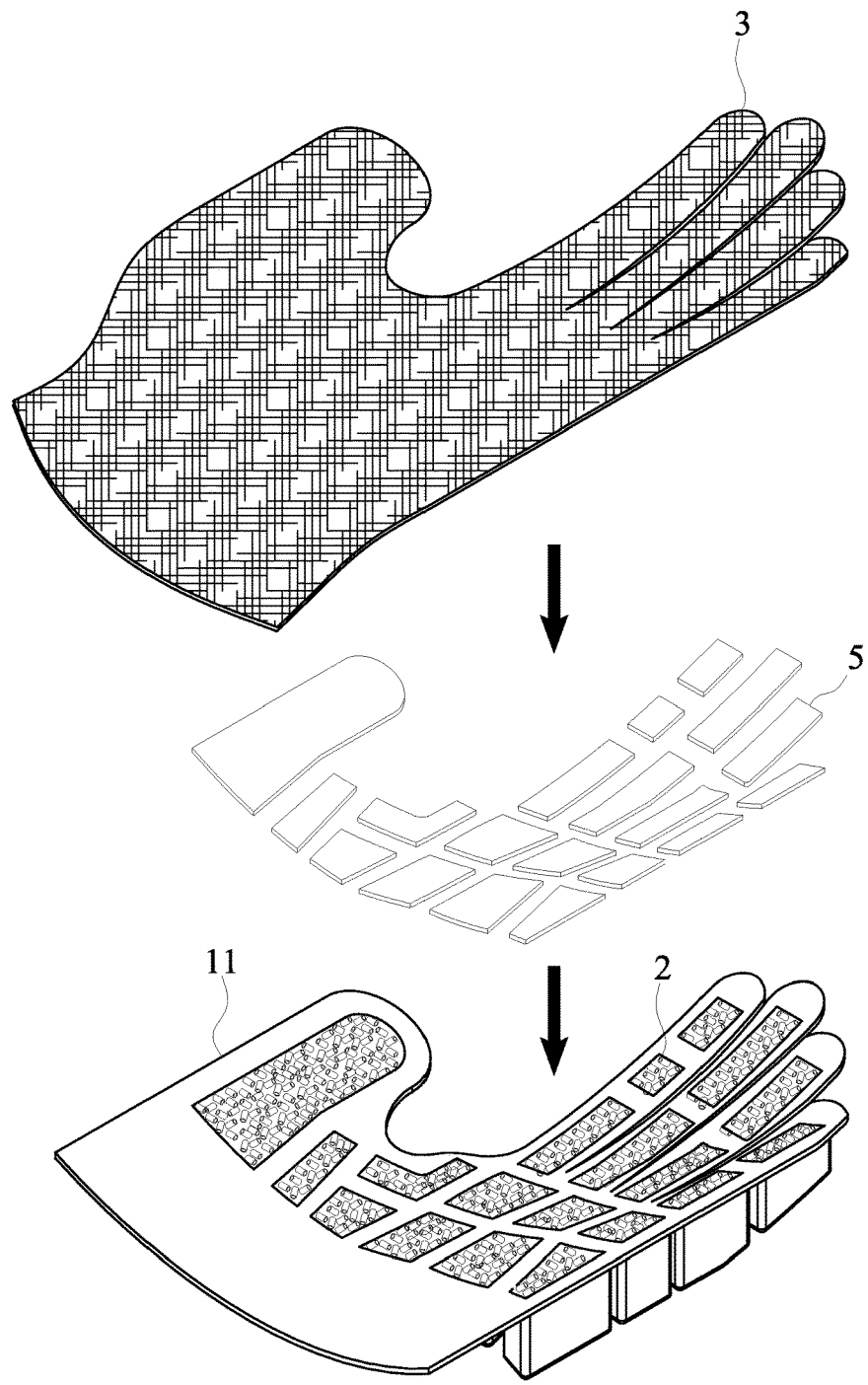
FIG. 6 is a schematic view of the status of Step S4 of a preferred embodiment of this disclosure.
Figure 7:
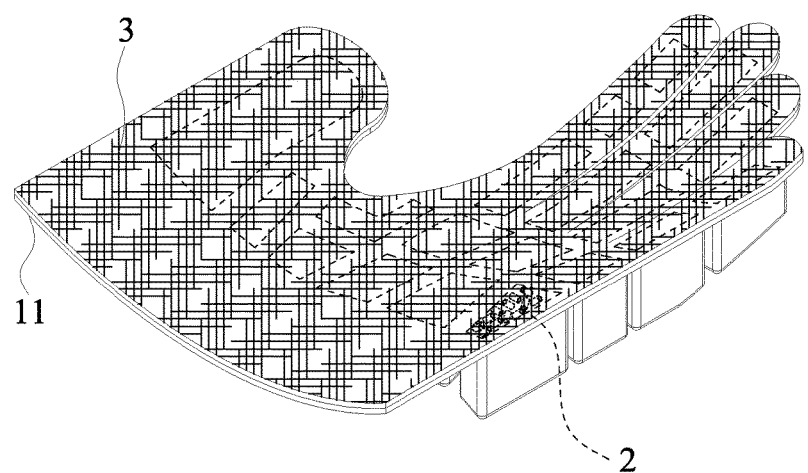
FIG. 7 is a schematic view of the status of Step S5 of a preferred embodiment of this disclosure.

This disclosure will become clearer in light of the following detailed description of an illustrative embodiment of this invention described in connection with the drawings.

With reference to FIGS. 1 and 2 to 7 for a flow chart and schematic views of the statuses of different steps of a method of manufacturing a sport protective equipment in accordance with a preferred embodiment of this disclosure respectively, the manufacturing method comprises the following steps:

S1: Provide a thin sheet material, a filler and a substrate, wherein the substrate is in the shape of a covered using portion. It is noteworthy that the thin sheet material 1 of this disclosure is one selected from the group consisting of thermoplastic polyurethane (TPU) and polyvinylchloride (PVC) with good elasticity, flexibility and ductility, and the thin sheet is material 1 can be shaped easily after being heated, so that this material is applicable in a vacuum shaping process and usually in a thin sheet form to prevent the shaped object from being too hard and causing a potential risk of injuries. The filling material 2 of this disclosure falls within a wide range and is selected from the group consisting of a foam, an airbag, a tubular polypropylene PP particle, a foaming polyethylene (PE) particle, and any combination of the above, and these materials are often used for absorbing the impact of a collision and has a good restoring elasticity. The actual tests conducted by the discloser of this disclosure show that the tubular polypropylene PP particle and the foaming polyethylene (PE) particle are preferred, since the relatively large particles of these material cause a low density of filling due to the good shock absorbing property of these materials. Therefore these materials are selected and used in this disclosure, not just improving the shock absorbing effect for collisions only, but also taking the features of lightweight and convenient mobility into consideration.

To improve the aesthetic appearance and protection of the sports protective equipment, this disclosure further comprises the step (S1-1): Fix a surface material 4 onto a surface of the thin sheet material 1 by printing or bonding, wherein the surface material 4 is one selected from the group consisting of a dye, an elastic fabric and a plastic material, so that after the thin sheet material 1 is formed, the surface material 4 is maintained to be covered onto a surface of the thin casing 11. It is noteworthy that the surface material 4 is a decorative layer and a protective layer formed on a surface of the thin casing 11 while the thin casing 11 is being formed. Such arrangement not just improves the aesthetic appearance only, but also provides a shock absorbing effect when the thin casing is collided.

S2: Manufacture a thin casing 11 by the thin sheet material 1 in a vacuum forming process, and form a plurality of protrusions 111 arranged apart from one another on a surface of the thin casing 11, such that a containing space 112 is formed on an inner side of each protrusion 111, and the thin casing 11 is manufactured in the shape of the substrate 3. In a vacuum forming process, the thin sheet material 1 is preheated and softened and then clamped into a mold to form the thin casing 11 by a vacuum shaping process, such that the protrusions 111 arranged apart with each other are formed on a surface corresponsive to the mold, and the protrusion 111 contains a containing space 112 therein. After the shaping process is completed, the thin casing 11 is cut into a shape corresponsive to the substrate 3 to facilitate carrying out the processes that follow. It is noteworthy that the thin sheet material has the physical properties including elasticity, flexibility and ductility, so that the thin sheet material applied in the vacuum forming process will not break or crack easily.

S3: Fill the filler 2 into each of the containing spaces 112. After the process of forming the thin casing 11 is completed, the filler 2 may be filled into each of the containing spaces 112 sequentially, and the level of filling may be adjusted as needed, but the level of filling is recommended to be 80% or more.

S4: Install a supporting material 5 between the filler 2 and the substrate 3, wherein the supporting material 5 is a PE sheet material with a good supporting effect. To further improve the supporting effect and prevent deformations caused by an insufficient strength of the thin casing 11 of the sport protective equipment of this disclosure, the supporting material 5 is installed between the filler 2 and the substrate 3, wherein a PE sheet material is used as the supporting material 5 of this disclosure to maintain a light weight of the sports protective equipment.

S5: Seal the bottom of the thin casing 11 by the substrate 3, so that the filler 2 in each of the containing spaces 112 will not fall out. The substrate 3 and the thin casing 11 are sealed by high frequency or thermal fusion, so that the filler 2 and the supporting material 5 in the containing space 112 will not fall out. After being sewn with other fabrics, a sport protective equipment is manufactured.

Figure 8:
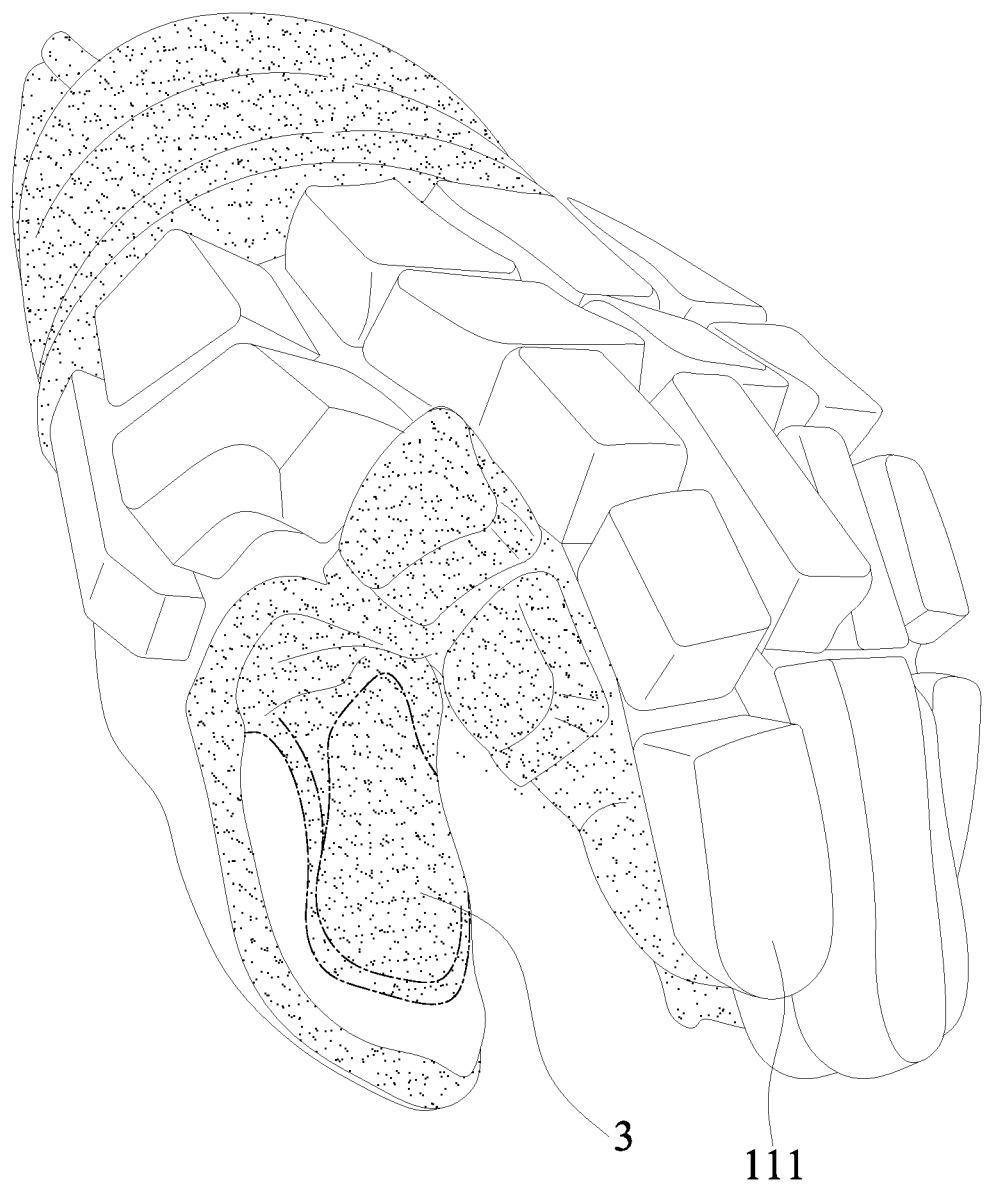
FIG. 8 is a schematic view of a sport protective equipment of a preferred embodiment of this disclosure which is applied to a glove.
Figure 9:
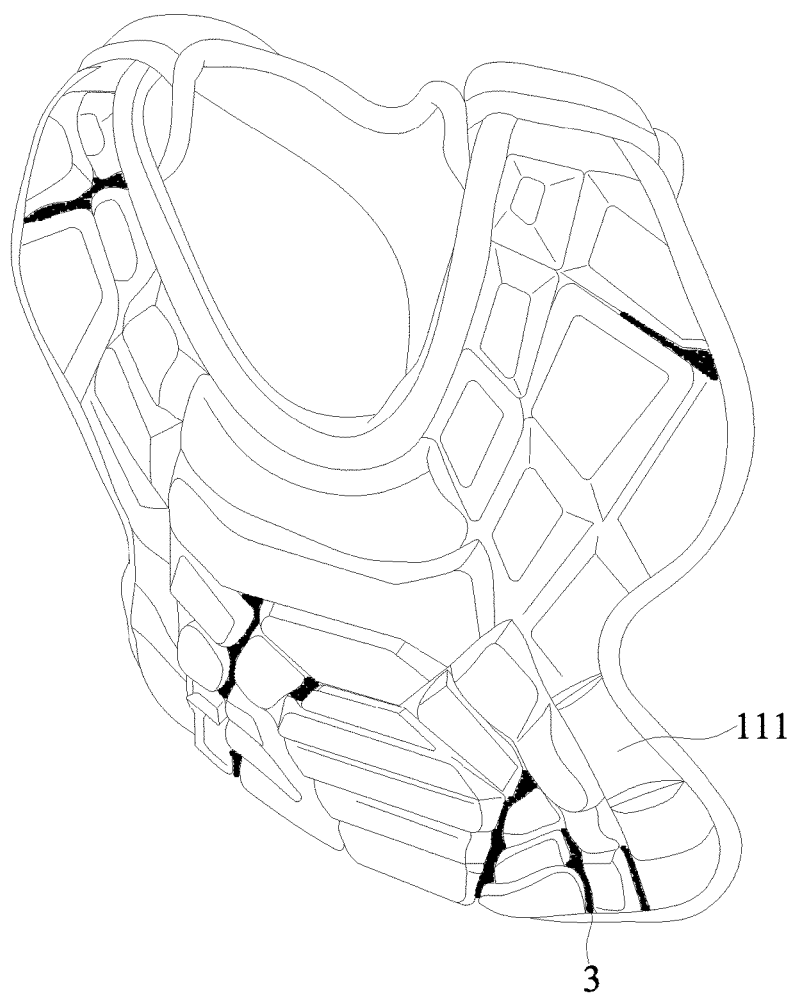
FIG. 9 is a schematic view of a sport protective equipment of a preferred embodiment of this disclosure which is applied to a catcher's protective gear.

With reference to FIGS. 8 and 9 for the perspective views of a preferred embodiment of this disclosure applied to different sports protective equipments, a sport protective equipment manufactured according to the aforementioned manufacturing procedure comprises the thin casing 11, the filler 2 and the substrate 3.

Wherein, the thin casing 11 is formed by the thin sheet material 1 in a vacuum forming process, and then a plurality of protrusions 111 is formed and arranged apart with one another on a surface of the thin casing 11, and a containing space 112 is formed on an inner side of each protrusion 111. The thin sheet material 1 is one selected from the group consisting of thermoplastic polyurethane (TPU) and polyvinylchloride (PVC).

The filler 2 is filled into each of the containing spaces 112, wherein the filling material 2 is one selected from the group consisting of a foam, an airbag, a tubular polypropylene PP particle, a foaming polyethylene (PE) particle, and any combination of the above.

The substrate 3 is manufactured in the shape of a corresponsive a covered using portion, and the thin casing 11 is in a shape corresponsive to the substrate 3, and the thin casing 11 is sealed by the substrate 3, so that the filler 2 in each of the containing spaces 112 will not fall out.

In addition, the surface material 4 is bonded on a surface of the thin sheet material 1, wherein the surface material 4 is one selected from the group consisting of an elastically contractible fabric and a plastic material, so that the surface material 4 is covered onto a surface of the thin casing 11. In addition, the supporting material 5 is installed between the filler 2 and the substrate 3, wherein the supporting material 5 is a PE sheet material with a good supporting effect and capable of providing the required supporting effect. In the figure, this disclosure may be applied as a protective glove for ice hockey or hockey, or applied as a catcher's protective gear for baseball. Since the sport protective equipment of this disclosure has the advantages of light weight and high flexibility, it can be applied as a sport protective equipment for various sports such as a motorcycle protective gear, an American football protective gear, etc.

What is claimed is:

1. A method of manufacturing a sports protective equipment, comprising the steps of:
providing a thin sheet material, a filler and a substrate, wherein the substrate is in the shape of a covered using portion;
manufacturing a thin casing by the thin sheet material in a vacuum forming process, and forming a plurality of protrusions arranged apart from one another on a surface of the thin casing, such that a containing space is formed on an inner side of each protrusion, and the thin casing is manufactured in a shape corresponsive to the shape of the substrate;
filling the filler into each of the containing spaces;
installing a supporting material, wherein the supporting material is installed between the filler and the substrate, and the supporting material is a sheet material made of polyethylene (PE); and
sealing a bottom of the thin casing by the substrate, so that the filler in each of the containing spaces will not fall out,
wherein the thin sheet material is one selected from the group consisting thermoplastic polyurethane (TPU) and polyvinylchloride (PVC), and the thin sheet material has physical properties including elasticity, flexibility, and ductility and is applicable to a vacuum forming process without the risk of being broken or cracked easily.

2. The method of manufacturing a sport protective equipment according to claim 1, further comprising the step of bonding a surface material, wherein a surface material is fixed onto a surface of the thin sheet material by printing or bonding before the steps of "providing a thin sheet material, a filler and a substrate, wherein the substrate is in the shape of a covered using portion" takes place, and the surface material is one selected from the group consisting of a dye, an elastic fabric, and a plastic material, so that after the thin sheet material is formed, the surface material is maintained to be covered onto a surface of the thin casing.

3. The method of manufacturing a sport protective equipment according to claim 1, further comprising the step of embossing a pattern, wherein a tread portion with a corresponsive pattern or word is embossed on a surface of the thin sheet material in advance before the step of "providing a thin sheet material, a filler and a substrate, wherein the substrate is manufactured in the shape of a covered using portion" takes place.

4. The method of manufacturing a sport protective equipment according to claim 1, wherein the thin sheet material has a printed layer disposed on a surface of the thin sheet material.

5. The method of manufacturing a sport protective equipment according to claim 3, wherein the thin sheet material has a printed layer disposed on a surface of the thin sheet material.

6. The method of manufacturing a sport protective equipment according to claim 1, wherein the filling material is one selected from the group consisting a foam, an airbag, a tubular polypropylene (PP) particle, a foaming polyethylene (PE) particle, and any combination thereof.

* * * * *